U S008676739B2

(12) United States Patent  (10) Patent No.: US 8,676,739 B2
Arndt et al.  (45) Date of Patent: Mar. 18, 2014

(54) DETERMINING A PREFERRED NODE IN A CLASSIFICATION AND REGRESSION TREE FOR USE IN A PREDICTIVE ANALYSIS

(75) Inventors: Karla K. Arndt, Rochester, MN (US); James M. Caffrey, Woodstock, NY (US); Aspen L. Payton, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 229 days.

(21) Appl. No.: 12/944,353

(22) Filed: Nov. 11, 2010

(65) Prior Publication Data

US 2012/0123991 A1  May 17, 2012

(51) Int. Cl.
*G06F 17/00* (2006.01)

(52) U.S. Cl.
USPC .......................................................... 706/50

(58) Field of Classification Search
USPC .......................................................... 706/50
See application file for complete search history.

(56) References Cited

U.S. PATENT DOCUMENTS

| | | | | |
|---|---|---|---|---|
| 5,634,087 | A * | 5/1997 | Mammone et al. | 706/25 |
| 5,657,424 | A * | 8/1997 | Farrell et al. | 704/255 |
| 5,982,934 | A * | 11/1999 | Villalba | 382/226 |
| 7,133,856 | B2 | 11/2006 | Huang et al. | |
| 7,562,063 | B1 * | 7/2009 | Chaturvedi | 706/50 |
| 7,647,326 | B2 * | 1/2010 | Shivaji-Rao et al. | 707/999.01 |
| 7,805,395 | B2 * | 9/2010 | Howard et al. | 706/50 |
| 7,937,336 | B1 * | 5/2011 | Maynard-Zhang et al. | 706/12 |
| 2001/0044766 | A1 | 11/2001 | Keyes | |
| 2002/0052858 | A1 | 5/2002 | Goldman et al. | |
| 2002/0194148 | A1 | 12/2002 | Billet et al. | |
| 2003/0120430 | A1 * | 6/2003 | Michiel van Rhee | 702/19 |
| 2003/0126103 | A1 * | 7/2003 | Chen et al. | 706/50 |
| 2005/0096950 | A1 * | 5/2005 | Caplan et al. | 705/7 |
| 2005/0170528 | A1 * | 8/2005 | West et al. | 436/518 |
| 2007/0038705 | A1 | 2/2007 | Chickering et al. | |
| 2007/0233435 | A1 * | 10/2007 | Bradski | 703/2 |
| 2008/0077544 | A1 | 3/2008 | Sureka | |
| 2008/0168011 | A1 | 7/2008 | Steinberg | |
| 2008/0300797 | A1 * | 12/2008 | Tabibiazar et al. | 702/19 |
| 2009/0228160 | A1 | 9/2009 | Eklund et al. | |
| 2009/0319244 | A1 * | 12/2009 | West et al. | 703/11 |
| 2009/0326383 | A1 | 12/2009 | Barnes et al. | |
| 2010/0049538 | A1 | 2/2010 | Frazer et al. | |
| 2010/0131440 | A1 * | 5/2010 | Chen et al. | 706/15 |
| 2011/0016076 | A1 * | 1/2011 | Howard et al. | 706/50 |
| 2011/0172501 | A1 * | 7/2011 | Antonijevic et al. | 600/300 |
| 2013/0097109 | A1 * | 4/2013 | Arndt et al. | 706/46 |

OTHER PUBLICATIONS

P. N. Price et al, "Characterizing Buildings for Airflow Models: What Should We Measure?" Lawrence Berkeley National Laboratory, LBNL-55321, 7 pages, Jun. 2004.*

(Continued)

*Primary Examiner* — Kakali Chaki
*Assistant Examiner* — Fuming Wu
(74) *Attorney, Agent, or Firm* — Patterson & Sheridan LLP (57) ABSTRACT

Techniques are described for determining what node of a classification and regression tree (CART) should be used by a predictive analysis application. A first approach is to use a standard deviation of the data at a given the level of the CART to determine whether data in the next, lower node is more consistent than the data in the current node. A second approach is to measure a correlation between data points in a given node and the time at which each point was sampled (or other correlation metric) to identify a preferred node.

12 Claims, 9 Drawing Sheets

(56) References Cited

OTHER PUBLICATIONS

Alin Viorel Dobra, "Scarable Classification and Regression Tree Construction," PhD Dissertation, Cornell University, Aug. 2003.*

Donald E. Brown et al., "Classification trees with optimal multivariate decision nodes," Pattern Recognition Letters, Jun. 1996, vol. 17(7): pp. 699-703.

* cited by examiner

DETERMINING A PREFERRED NODE IN A CLASSIFICATION AND REGRESSION TREE FOR USE IN A PREDICTIVE ANALYSIS

BACKGROUND

Embodiments of the invention are directed to techniques which may be used as part of a predictive modeling analysis. More specifically, embodiments of the invention provide methods and systems for determining a node in a classification and regression tree (CART) to use for a predictive modeling analysis.

In large scale computing deployments, one common resiliency problem is solving what is referred to as "soft failures," where a computing system does not crash, but simply stops working correctly or slows down to a point of being effectively non-functional. Predictive analysis is a technique used to identify when a current set of sampled metrics for a computing system indicates that a future event is likely to occur (e.g., to predict when a soft failure is likely to occur). For example, predictive analysis may be used to evaluate changes over time in an amount of shared memory available to multiple virtual machine instances on a server to identify when a memory usage trend indicates that an out-of-memory condition is developing on that server. Predictive analysis relies on historical data and mathematical modeling to predict expected future activity based on the historical data and mathematical modeling of a system in order to determine when trends indicate a system problem (or other modeled event) could occur.

One approach for predictive analysis tools (i.e., a software application configured to perform a predictive failure analysis) is to use classification and regression trees (CART) to identify and isolate trends in a set of data. As is known, a CART tree splits a set of data into a series of nodes, which become more and more granular farther down the CART tree. Each branch of the tree ends in a terminal (or leaf) node when no further gain is achieved by splitting the data into nodes with fewer elements of data. Classification and regression trees are an established technology.

However, when using CART regression trees for predictive modeling, a predictive analysis tool needs to determine how far to traverse down the CART tree in order to identify a node at which to base a prediction. Frequently, traversing a CART branch all the way to the terminal node results in a set of data that is too small to use for generating a predictions, i.e., for performing a predictive failure analysis.

SUMMARY

Embodiments of the invention may be used to help predict when a monitored metric indicates that an impending failure is likely to occur in order to allow a corrective action to be performed. One embodiment of the invention includes a method for determining a set of data to use for a predictive analysis. The method itself may generally include identifying a sequential set of sampled values of at least one performance metric and generating, from the set of sampled values, a classification and regression tree. Each level of the classification and regression tree below a root node splits the set of sampled values into at least two nodes, each node containing a subset of the sampled values. The method may also include traversing a specified branch of the classification and regression tree until identifying one of the nodes for use by a predictive modeling analysis.

Still another embodiment of the invention includes a computer-readable storage medium storing an application, which, when executed on a processor, performs an operation for determining a set of data to use for a predictive analysis. The operation itself may generally include identifying a sequential set of sampled values of at least one performance metric and generating, from the set of sampled values, a classification and regression tree. Each level of the classification and regression tree below a root node splits the set of sampled values into at least two nodes, each node containing a subset of the sampled values. The operation may further include traversing a specified branch of the classification and regression tree until identifying a preferred node for use by a predictive modeling analysis.

Still another embodiment of the invention includes a system having a processor; and a memory storing an application program, which, when executed on the processor, performs an operation for determining a set of data to use for a predictive analysis. The operation itself may generally include identifying a sequential set of sampled values of at least one performance metric and generating, from the set of sampled values, a classification and regression tree. Each level of the classification and regression tree below a root node splits the set of sampled values into at least two nodes, each node containing a subset of the sampled values. The operation may further include traversing a specified branch of the classification and regression tree until identifying a preferred node for use by a predictive modeling analysis.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for determining what node of a classification and regression tree (CART) should be used by a predictive analysis application. That is, embodiments of the invention determine a node in the CART tree which should be used when evaluating a predictive model. As described in greater detail below, two different approaches may be used to evaluate the nodes in a branch of the tree to determine if the next node presents an improvement over the current node for use by the predictive model. In one embodiment, a standard deviation of the data at a given the node is used to determine whether data in the next, lower node is more consistent than the data in the current node. Alternatively (or additionally), a correlation between data points in a given node and the time at which each point was created (or other correlation metric) may be used to identify a preferred node. These approaches prevent traversing farther down the branch than is required to reach the preferred node. Traversing past the preferred node would waste processing capacity. Further, in either scenario, the number of data points in the node may be evaluated to ensure that enough data is available to provide a representative sample for the predictive model.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access monitor applications or related data present in a cloud environment. For example, the monitoring application could monitor an amount of shared memory (or other resources) available to multiple virtual machine instances in a cloud-based server deployment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments of the invention are described using an example of monitoring of a performance metric of a computing system over data communications network. However, it should be understood that the techniques described herein for identifying a preferred node in CART trees may be adapted to a variety of purposes in addition to the uses for predictive modeling analysis. Accordingly, references to an embodiment for predicting a computer system failure are included to be illustrative and not limiting.

Figure 1:
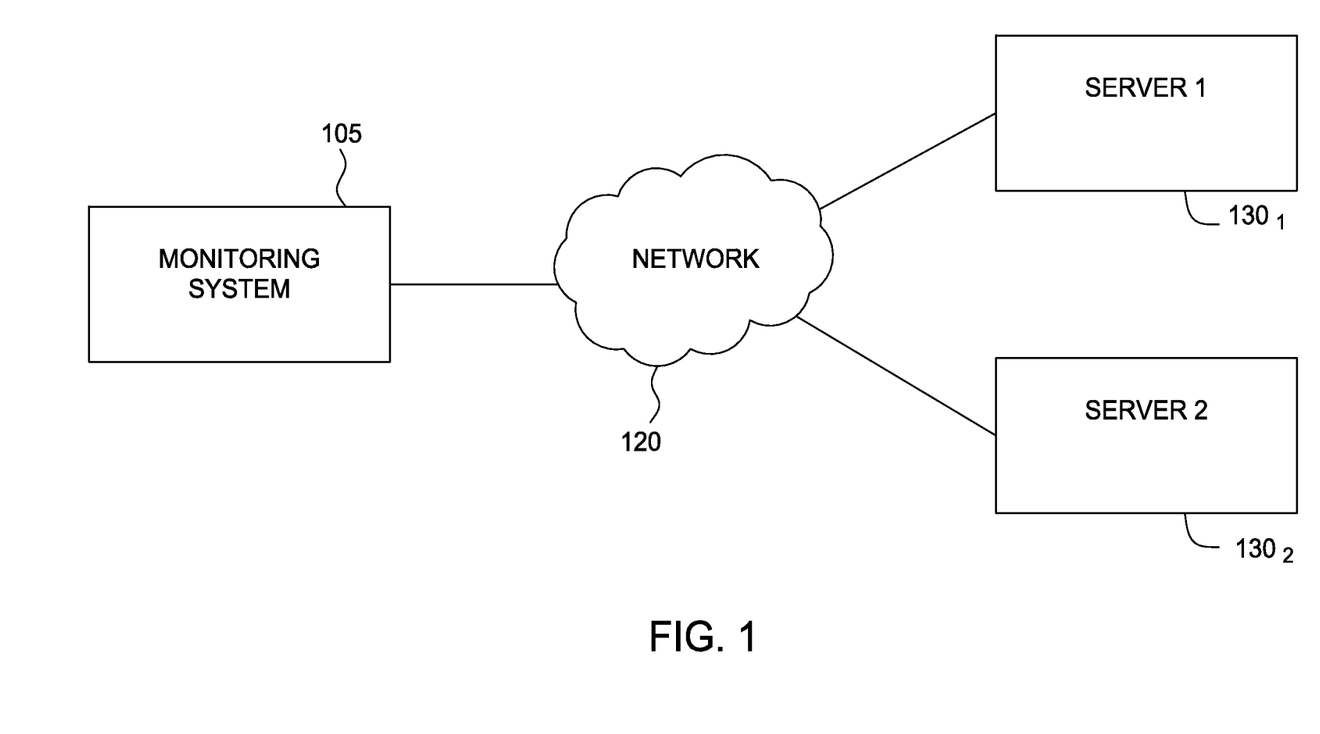
FIG. 1 illustrates an example computing infrastructure in which embodiments of the invention may be implemented.

FIG. 1 illustrates an example computing infrastructure 100 in which embodiments of the invention may be implemented. As shown, the computing infrastructure 100 includes a monitoring system 105 and server systems $130_{1-2}$, each connected to a communications network 120. In this example, the monitoring system 105 communicates over the network 120 to monitor the ongoing state of the server systems 130. As one example, the monitoring system 105 could be configured to monitor the consumption of shared resources on each of the servers 130. Of course, the monitoring system 105 could be configured to monitor a variety of performance metrics related to the function of the server systems 130, e.g., CPU utilization, shared (or dedicated) storage consumption, virtual storage consumption, error message traffic, system message (console) traffic, latching (latches held/released, transaction response times, disk I/O response times, disk I/O activity (reads, writes, etc.). Further, one of ordinary skill in the art will recognize that the particular metrics may be selected as needed in a particular case.

Figure 2:
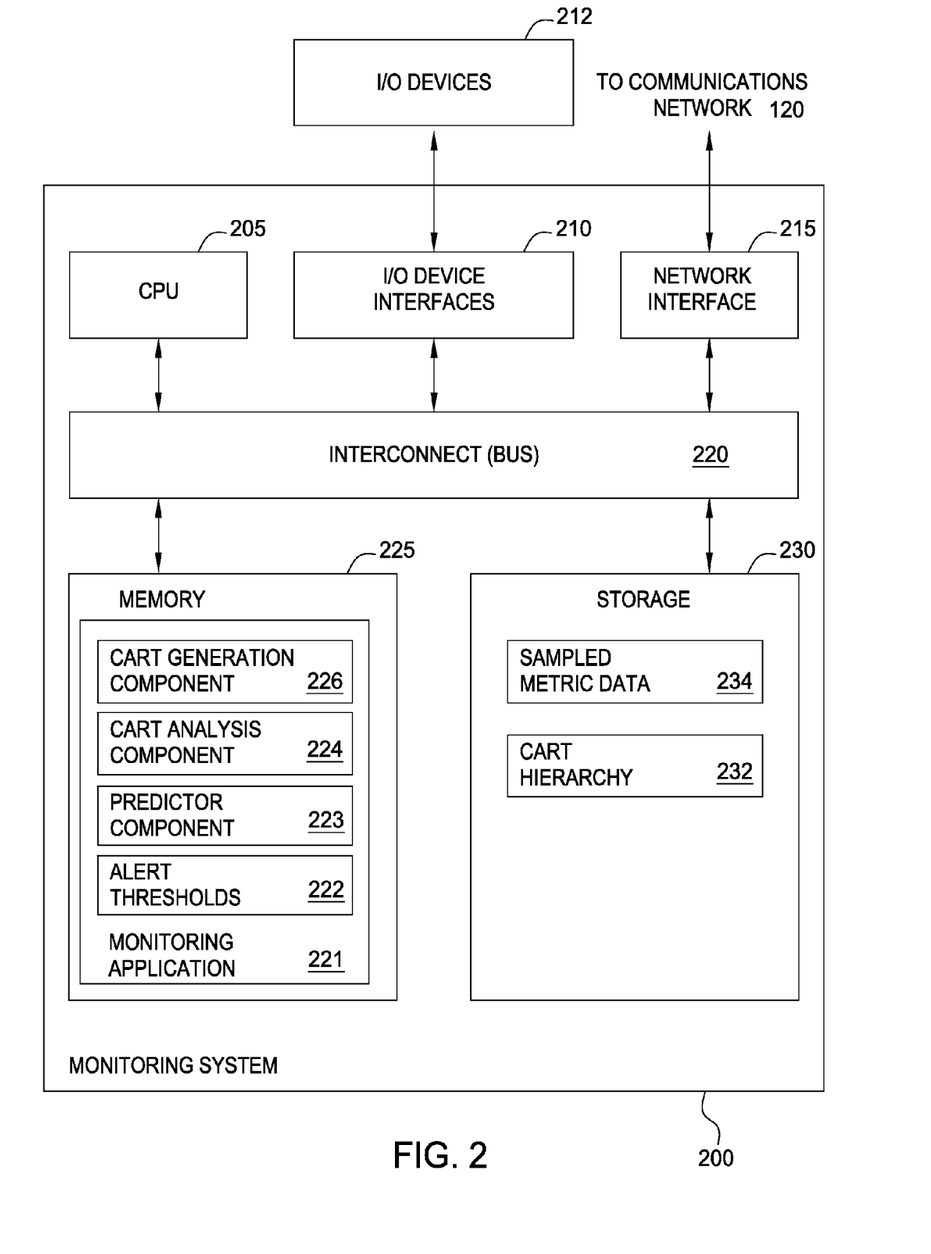
FIG. 2 illustrates an example computing system used to provide a monitor the performance metrics, according to one embodiment of the invention.

FIG. 2 illustrates a computing system 200 that includes a monitoring application 221 configured to determine a node in a classification and regression tree to use for a predictive modeling analysis, according to one embodiment of the invention. As shown, the computing system 200 includes, without limitation, a central processing unit (CPU) 205, a network interface 215, an interconnect 220, a memory 225, and storage 230. The computer system 200 may also include an I/O device interface 210 connecting I/O devices 212 (e.g., keyboard, display and mouse devices) to the computer system 200.

In general, the CPU 205 retrieves and executes programming instructions stored in the memory 225. Similarly, the CPU 205 stores and retrieves application data residing in the memory 225. The interconnect 220 provides a communication path for transmitting programming instructions and application data between the CPU 205, I/O devices interface 210, storage 230, network interface 215, and memory 225. CPU 205 is included to be representative of a single CPU, multiple CPUs, a CPU having multiple processing cores, and the like. And the memory 225 is generally included to be representative of a random access memory. The storage 230 may be a hard disk drive or solid state storage device (SSD). Further, although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 stores a monitoring application 221 and storage 230 stores sampled metric data 234 and a CART hierarchy 232. The monitoring application 221 provides a software application configured to evaluate the sampled metric data 234 using a CART analysis to generate a CART hierarchy 232 from the sampled metric data 234. Further, once generated, the monitoring application 221 may identify a preferred node of the CART hierarchy 232 for use by a predictive model, e.g., to predict whether the sampled metric data 234 indicates a system failure (or other event) is likely to occur in a monitored system 200. Accordingly, as shown, the monitoring application 221 includes a CART generation component 226, a CART analysis component 224, a predictor component 223 and alert thresholds 222.

In one embodiment, the CART generation component 226 is configured to generate the CART hierarchy 223 from the sampled metric data 234. Once generated the CART analysis component 224 may evaluate the resulting CART hierarchy 232 to identify the preferred node within the CART hierarchy 232 for the predictor component 223 to use in evaluating the state of a system being monitored by the monitoring application 221. Returning to the example of monitoring shared memory (or other storage) on a computing system, the sampled metric data 234 could indicate the amount of shared space consumed by multiple processes (or virtual machine instances) on the monitored system over time. Further, the CART generation component 226 may use the samples of free space to generate CART tree 232, and the CART analysis component 224 could then determine which node of the CART tree 232 the predictor component 223 should use to evaluate for trends. For example, the predictor component 223 may determine whether the selected node indicated a pattern of shared resource use that was likely to result in a system failure, or "soft" failure. Such a failure could occur if the predicted level of future resource use exceeded alert thresholds 222 specified, e.g., a trend which indicates that all of the shared resources on the monitored system will be consumed at some point in the future.

Figure 3:
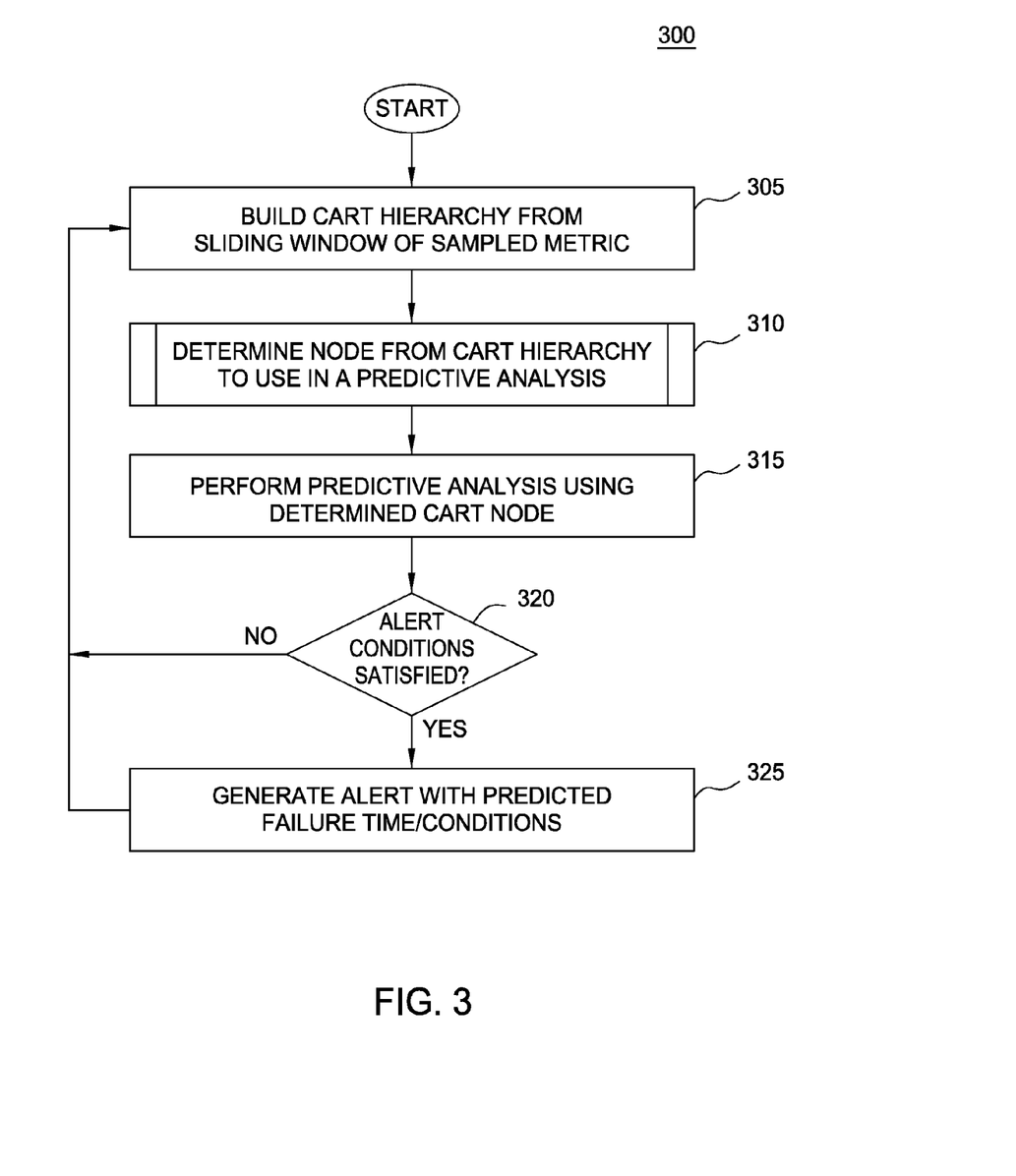
FIG. 3 illustrates a method for performing a predictive analysis using a classification and regression tree, according to one embodiment of the invention.

FIG. 3 illustrates a method 300 for performing a predictive analysis using a classification and regression tree, according to one embodiment of the invention. As shown, the method begins at step 305, where a monitoring application builds a CART tree from a set of sampled performance metrics values (or other data). Each level of the CART tree may split the sampled metric values at that level into two nodes, a left branch and a right branch. As noted, in one embodiment, the sampled metric may be an amount of available shared resources, CPU utilization, process creation rates, shared (or dedicated) storage consumption, virtual storage consumption, error message traffic, system message (console) traffic, latching (latches held/released, transaction response times, disk I/O response times, disk I/O activity (reads, writes, etc), or other performance related aspects of a computing system.

Figure 4:
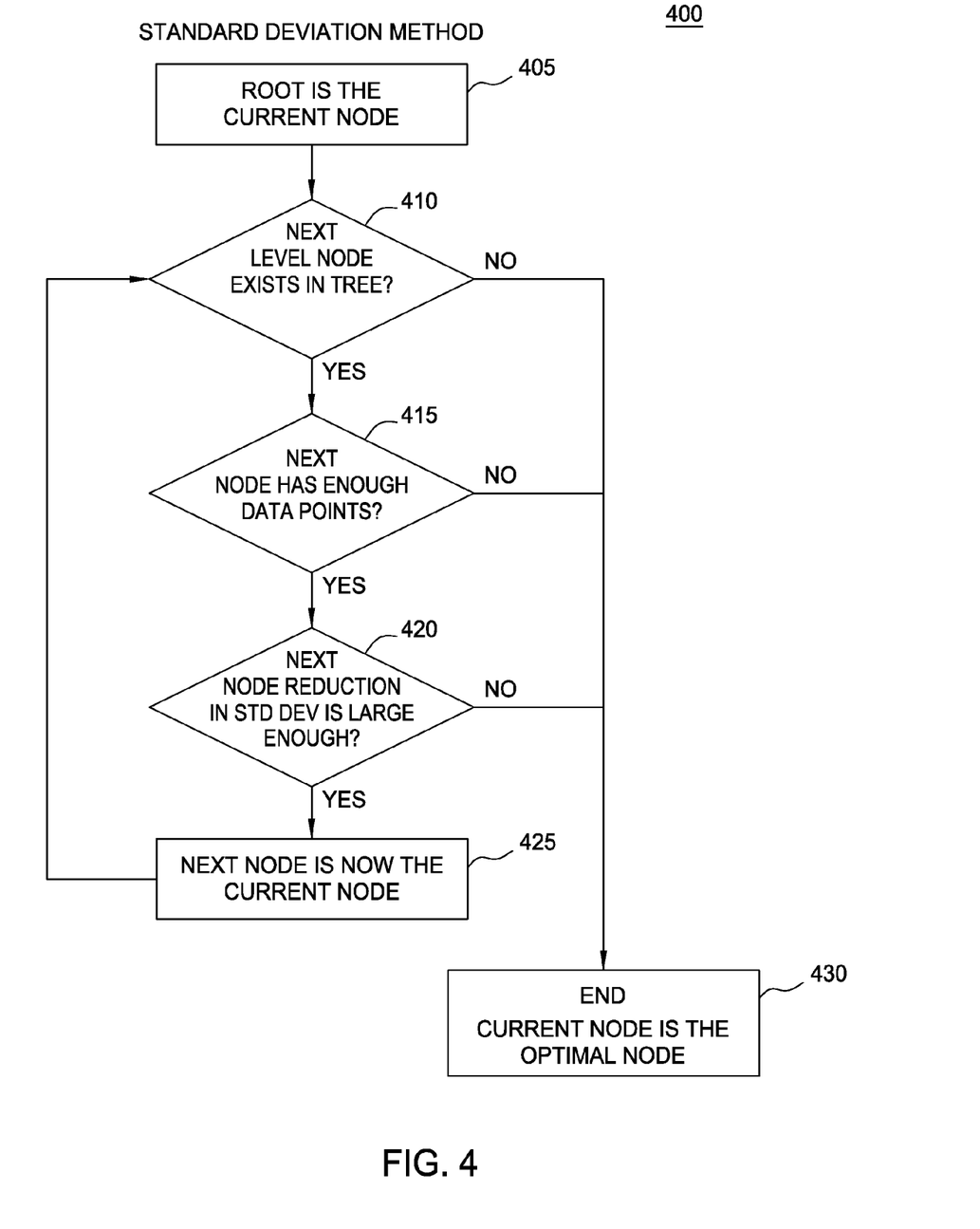
FIG. 4 illustrates a method for determining a node in a classification and regression tree for use in a predictive analysis, according to one embodiment of the invention.
Figure 5A:
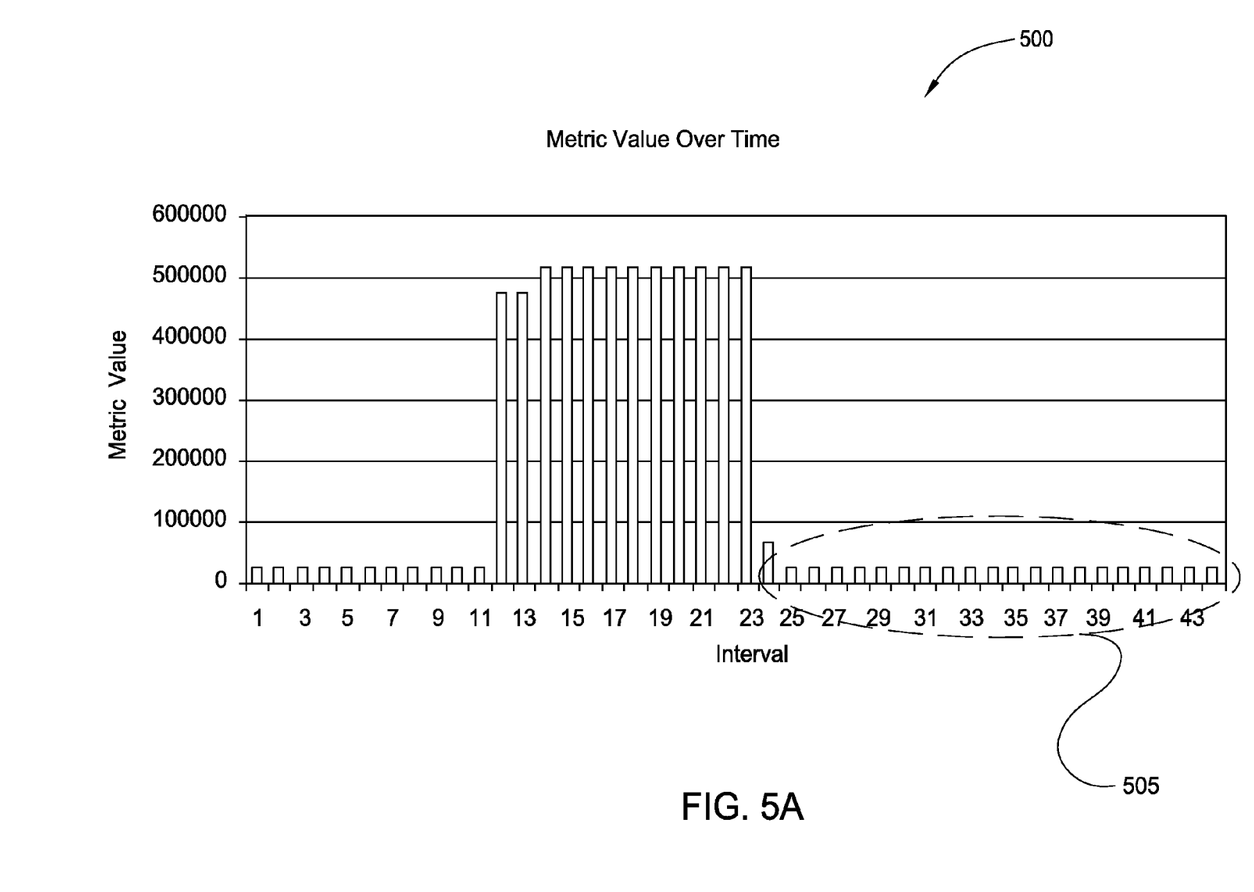
FIGS. 5A-5B illustrate an example of determining a node in a classification and regression tree use for a predictive analysis based on the method of FIG. 4, according to one embodiment of the invention.
Figure 5B:
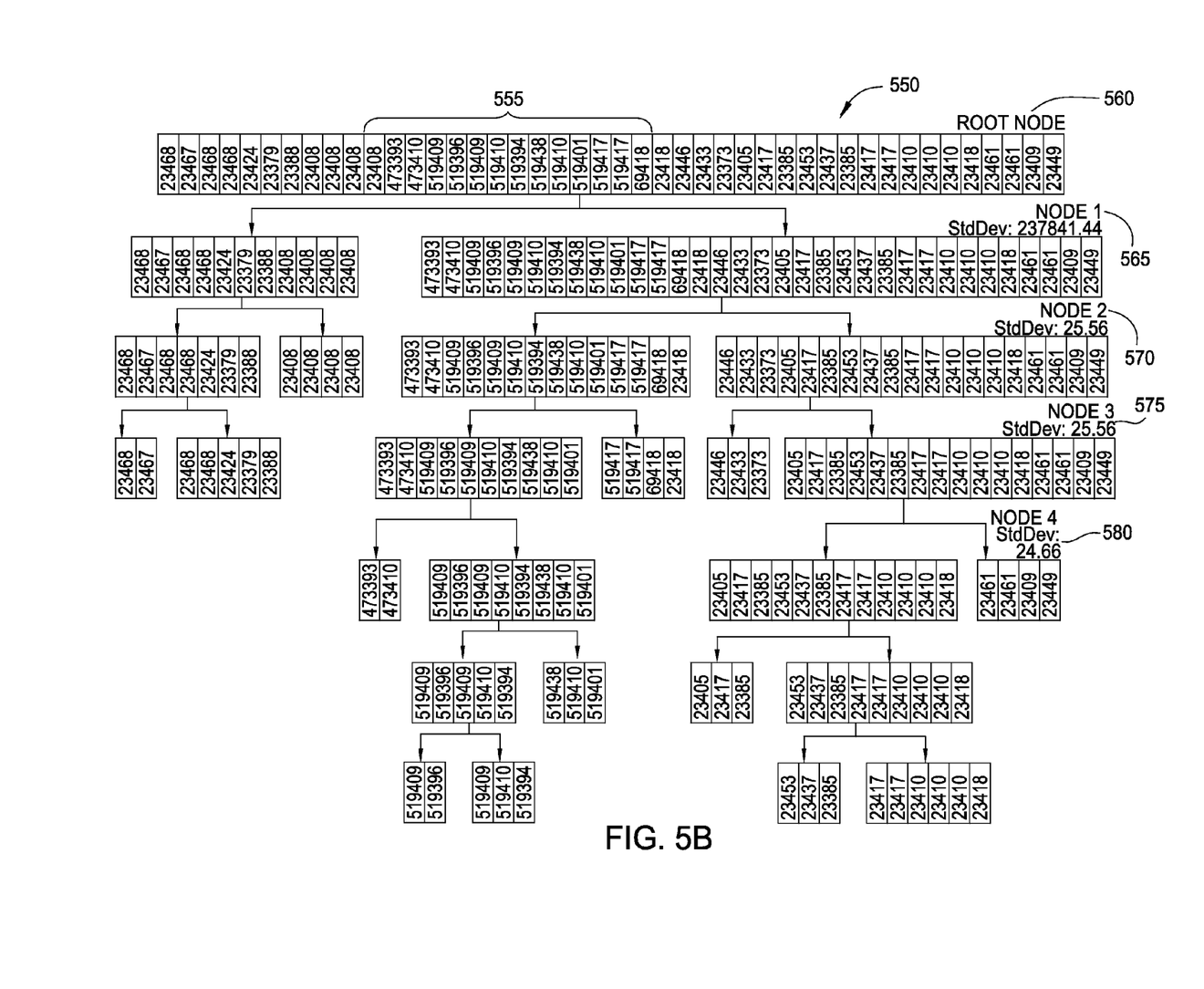
Figure 6:
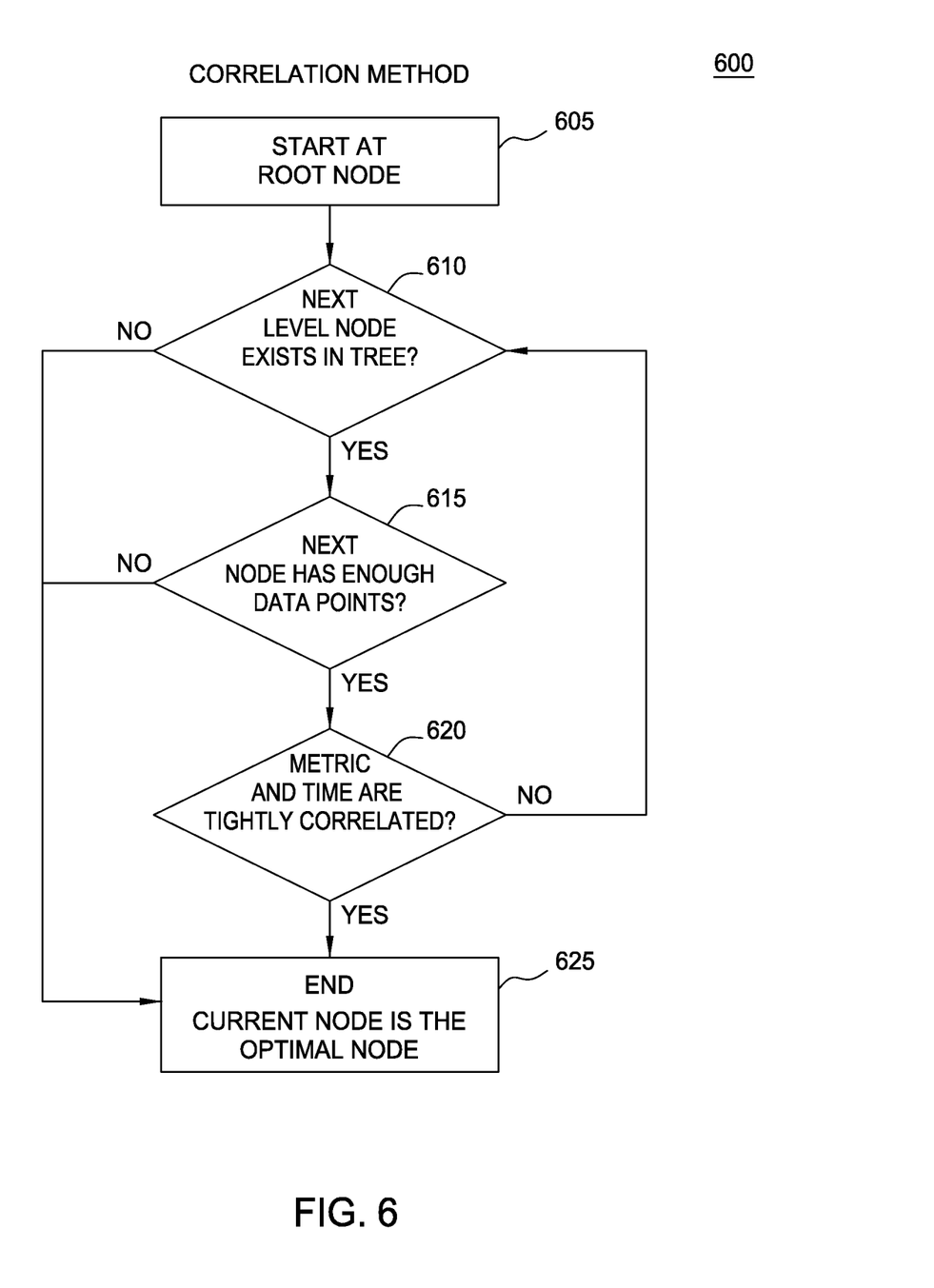
FIG. 6 illustrates a method for determining a node in a classification and regression tree for use in a predictive analysis, according to one embodiment of the invention.
Figure 7A:
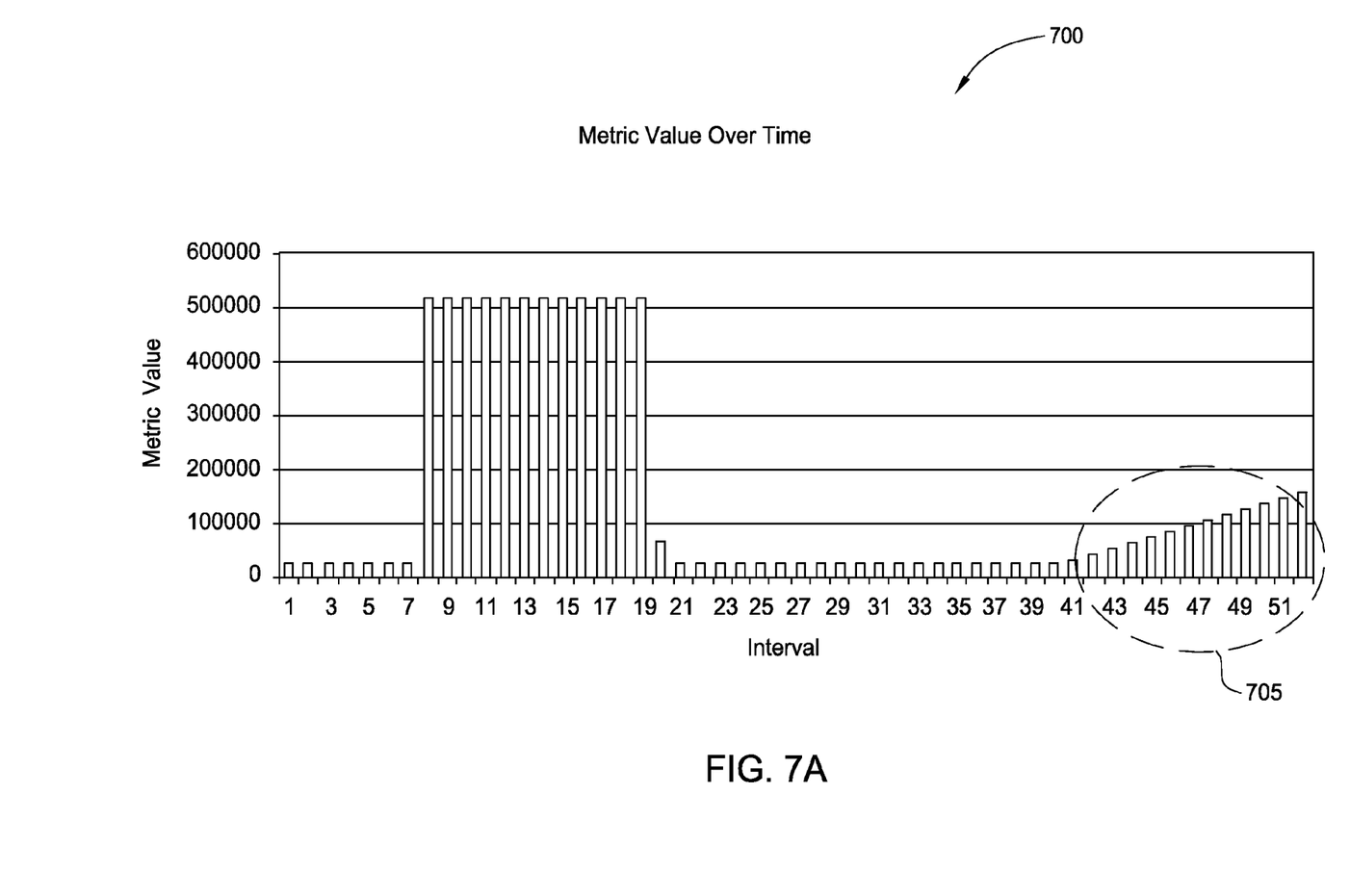
FIGS. 7A-7B illustrate an example of determining a node in a classification and regression tree use for a predictive analysis based on the method of FIG. 6, according to one embodiment of the invention.
Figure 7B:
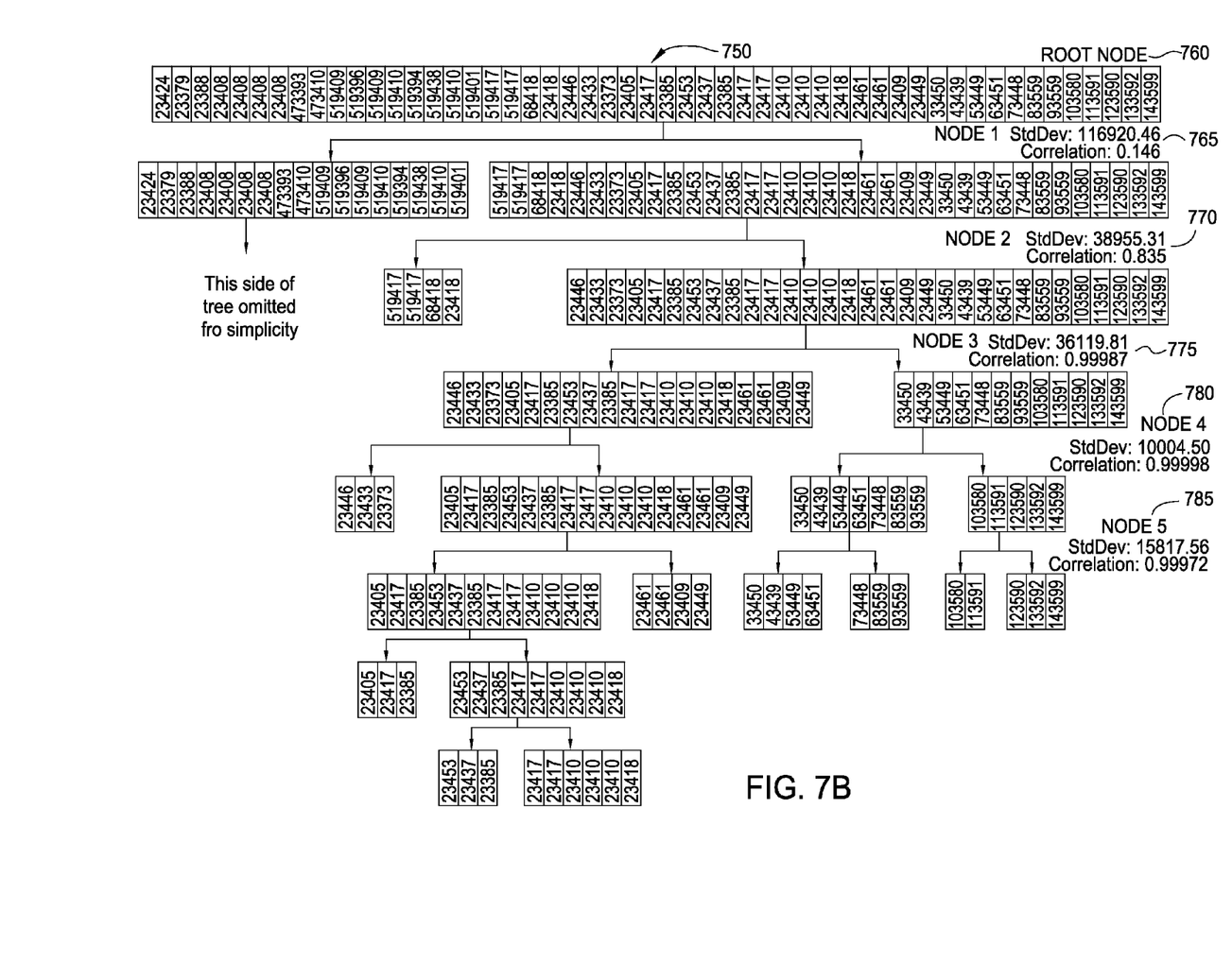

At step 310, the monitoring application may determine a node from the CART tree to use to evaluate a predictive analysis model. That is, the monitoring application may identify when to stop traversing down the CART tree because doing so would cease to improve the quality of the results of the predictive model. Further, the monitoring application may also determine whether the number of data points in the identified node includes enough data to provide a representative sample for the predictive model. In one embodiment, a standard deviation of the data at a given node is used to determine whether data in the next, lower node is more consistent than the data in the current node. An example of this embodiment is shown in FIG. 4 and FIG. 5A-5B. Alternatively (or additionally), a correlation between data points in a given node and the time at which each point was sampled (or other correlation metric) may be used to identify a preferred node. An example of this embodiment is shown in FIG. 6 and FIG. 7A-7B.

At step 315, once the node is identified, the sampled metric values in that node are evaluated, e.g., using a predictive model. Returning again to the example of shared memory resources, the predictive model could evaluate data at the identified node for a trend that indicated a system failure or other out-of-memory error was likely to occur. At step 320, if the results of the predictive evaluation satisfy any alert conditions, then at step 325, the motioning application generates an alert message, as may be appropriate for a given case. For example, a prediction could indicate not just a probable system failure was likely to occur, but when such a failure was likely to occur, based on a trend of shared memory consumption rates identified from the data of the node.

FIG. 4 illustrates a method 400 for determining a node in a classification and regression tree for use in a predictive analysis, according to one embodiment of the invention. As shown, the method 400 begins at step 405, where the root node of a CART tree is set as the current node. At step 410, if a next level of the CART tree exists, then at step 415, the monitoring application may determine whether the next node of the tree includes enough data points to provide a representative sample for making predictions of future system performance. If either the next node does not exist (the no branch of step 410) or does not include enough data points (the no branch of step 415), then the current node is identified as being the node for the predictive analysis. Otherwise, at step 420, the monitoring application may determine whether a change in a standard deviation calculated for elements of the next node is lower than a standard deviation calculated for elements of the current node. If the change exceeds a user specified threshold (i.e., if the standard deviation drops by a sufficient amount), then at step 425, the next node is set as the current node, and the method 400 returns to step 410. Otherwise, if the standard deviation does not sufficiently change (the no branch of step 420), then the current node is identified as being the node for a predictive analysis.

An example of the standard deviation approach is further illustrated in FIGS. 5A-5B. More specifically, FIGS. 5A-5B illustrate an example of determining a node in a classification and regression tree use for a predictive analysis based on the method of FIG. 4, according to one embodiment of the invention. First, FIG. 5A provides an example graph 500 of a sampled metric. The sampled metric corresponds to an amount of shared storage being consumed by a computing system sampled over forty-four intervals. As shown, following a spike in resource consumption at samples 12-23, the recent trend of resource consumption appears relatively low and stable. Section 505 represents the most recent trend in the data and represents behavior to isolate in the classification and regression tree.

Second, FIG. 5B shows a classification and regression tree 550 built from the collected data shown in FIG. 5A. A root node 560 stores the full set of sampled metric values. That is, the root node 560 includes the values for all forty-four sampled intervals. A first sampled value at the left of the root node 560 corresponds to interval 1 of graph 500 and the last sampled value corresponds to interval 44. Similarly, the metric values at region 555 generally correspond to the spike in resource consumption at intervals 12-23 of FIG. 5A. In addition to the root node 560, tree 550 includes a node 1, 565, node 2, 570, node, 3 575, and node 4, at successively deeper levels of the classification and regression tree 550.

As shown, the arrows connecting nodes on the right side of tree 550 isolate the most recent trend in the sampled metric. That is, as the right-most branch of the tree 550 represents the most recently sampled data, the nodes this branch correspond to the most recent trends or patterns of shared resource consumption. Traversing down the tree 550 results in a smaller set of data in the nodes of the right-most branch, as the nodes are split at each level. Each of the nodes 565-580 also includes a standard deviation calculated from the sampled metric values in the node at that level in the tree 550.

In order to determine the preferred node, the monitoring application navigates down the right-most branch of this tree as long as there is a sufficiently large reduction in the standard deviation (e.g., two orders of magnitude or more). Of course, the magnitude may be selected to suit the needs of a particular case. In this example, the initial split of the data in the root node 560 resulted in multiple trends being represented in node 1 565. Specifically, some of the intervals in region 555 are included in node 1 565. This results in a very large standard deviation of 237,841.44. However, traversing just one additional level down the right side branch to node 2 570 results in a reduction in the standard deviation value to 25.56, a reduction of nearly four orders of magnitude. This indicates that the data in node 2 570 is substantially more consistent than the data in node 1 565. Thus, the data in this node may be used by a predictive analysis model to generate a more reliable prediction. Further, since node 2 570 also contains many data points, this node may also provide a representative sample of data for a predictive model. However, traversing further down tree 550 to node 3 575 and node 4 580, does not provide a significant reduction in the standard deviation and since the number of data points also decreases, there is nothing to be gained from moving on to these nodes for generating of a prediction.

Accordingly, in this example, the monitoring application may determine that node 2 565 is the node to use when generating a prediction of future behavior. Specifically, node 2 565 isolates the most recent trend in the data (as evidenced by the great reduction in the standard deviation when the right-hand node is reduced to 19 intervals of data which exhibit the stabilization of the metric value) and node 2 265 contains enough data points to provide a representative sample of data.

FIG. 6 illustrates another method 600 for determining a node in a classification and regression tree use for a predictive analysis, according to one embodiment of the invention. As shown, the method 600 begins at step 605, where the root node of a CART tree is set as the current node. At step 610, if a next level of the CART tree exists, then at step 615, the monitoring application may determine whether the next node of the tree includes enough data points to provide a representative sample for making predictions of future system performance. If either the next node does not exist (the no branch of step 610) or does not include enough data points (the no branch of step 615), then the current node is identified as being the node for the predictive analysis.

Otherwise, at step 620, the monitoring application may determine whether the sampled values of the metric and time at which each point was sampled (or other correlation metric) are tightly correlated to one another. Once the data values at a given node are identified as being sufficiently correlated, then at step 625, that node is identified as the preferred node. That is, while traversing from the root node down the CART tree, once the data values at a given node exhibit a high-degree of correlation, the traversal may stop. Otherwise, if the data values at a given node are not tightly correlated (the no branch of step 620), then the method 600 then returns to step 610 to evaluate the next, successive level of the CART tree.

An example of the standard deviation approach is further illustrated in FIGS. 7A-7B. More specifically, FIGS. 7A-7B illustrate an example of determining a node in a classification and regression tree use for a predictive analysis based on the method of FIG. 6, according to one embodiment of the invention. First, FIG. 7A provides an example graph 700 of a sampled metric. The metric value corresponds to an amount of shared storage being consumed by a computing system sampled over 51 intervals. As shown, following a spike in resource consumption at samples 8-20, the recent trend of resource consumption appears relatively low and stable until reaching interval 41. From interval 41, the amount of resource consumption begins an increasing trend, which, if continued will eventually fully consume the available shared resource. The trend is represented in section 705, which represents the most recent trend in the data and represents behavior to isolate in the classification and regression tree.

FIG. 7B illustrates a classification and regression tree 750 built using the data samples shown in FIG. 7A. As in the example of FIG. 5A, the full set of metric values is present in the root node 760 at the top of the tree.

That is, the root node 760 includes the values for all fifty-one sampled intervals. A first sampled value at the left of the root node 760 corresponds to interval 1 of graph 700 and the last sampled value corresponds to interval 51. Similarly, the metric values at region 705 correspond to the trend of increasing resource consumption that begins at sampled interval 41. In addition to the root node 760, tree 750 includes a node 1, 765, node 2, 770, node, 3 775, node 4 780, and a node 5 785, at successively deeper levels of the classification and regression tree 750.

As shown, the arrows connecting nodes on the right side of tree 750 isolate the most recent trend in the sampled metric.

That is, as the right-most branch of the tree 750 represents the most recently sampled data, the nodes of this branch correspond to the most recent trends or patterns of shared resource consumption. Traversing down the tree 750 results in a smaller set of data in the nodes of the right-most branch, as the nodes are split at each level. Each of the nodes 765-785 also includes a standard deviation of each node in the right-most branch of the tree and a correlation value. In this embodiment, each interval of data may also have an associated timestamp. This correlation value is the correlation between the metric value and the timestamps in the set of data in a given node of the hierarchy (e.g., one of nodes 760-785. That is, if both the time stamps and sampled resource consumption increase by a relatively consistent amount for each interval in a given node, the higher the correlation value for that node. A variety of known statistical approaches may be used to determine a measure of correlation between the sampled intervals at a node and the timestamps of those values.

In order to determine the preferred node, the monitoring application navigates down the right-most branch of the tree 750 until reaching a node which exhibits a high-degree of correlation. In one embodiment, a configurable threshold is used to determine how strong (how close to 1.0) the user wants to require the correlation between time (or other correlation metric) and the metric value. That is, the needed degree of correlation can be tailored to suit the needs of a particular case. In the example of tree 750, some reduction in the standard deviation occurs from one node to the next, but nothing as dramatic as in the example of FIGS. 5A-5B. These changes in the standard deviation occur simply because the size of our sample is changing, rather than a change in the behavior of the metric. Thus, the standard deviation approach does not identify a node for this sampled set of data. At the same time however, a strong increase in the correlation values occurs from the root node 760 to node 1 765 and node 2 770, etc. Specifically, the correlation jumps from a very low correlation of 0.146 in node 1 765, to a much stronger correlation of 0.835 in node 2 770, to a nearly perfect correlation of 0.99987 in node 3 775. A correlation this tight is a strong indication of a trend in the sampled metric that is closely tied to time, and thus can result in a reliable prediction. Further, since node 3 775 also contains several data points, this node provides a representative sample for the purposes of generating a prediction. Further still, looking ahead to node 4 780 and node 5 785 in this example, the further improvement in the correlation is negligible and since the number of data points also decreases, there is nothing to be gained by traversing these nodes for the generation of a prediction.

Accordingly, in this example, the monitoring application determines that node 3 775 is the preferred node to use when generating a prediction of future behavior. Specifically, node 3 775 isolates the most recent trend in the data (as evidenced by the extremely strong correlation with time when the right-hand node is reduced to 12 intervals of data which exhibit the steady growth in the metric value) and node 3 775 contains enough data points to provide a representative sample of data.

Advantageously, embodiments of the invention provide techniques for determining what node of a classification and regression tree (CART) should be used by a predictive analysis application. That is, embodiments of the invention determine a preferred node in the CART tree which should be used when evaluating a predictive model. As described in greater detail below, two different approaches may be used to evaluate the nodes in a branch of the tree to determine if the next node presents an improvement over the current node for use by the predictive model. In one embodiment, a standard deviation of the data at a given the node is used to determine whether data in the next, lower node is more consistent than the data in the current node. Alternatively (or additionally), a correlation between data points in a given node and the time at which each point was created (or other correlation metric) may be used to identify the preferred node. These approaches prevent traversing farther down the branch than is required to reach the preferred node. Traversing past the preferred node would waste processing capacity. Further, in either scenario, the number of data points in the node may be evaluated to ensure that enough data is available to provide representative sample for the predictive model.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium storing an application, which, when executed on a processor, performs an operation for determining a set of data to use for a predictive analysis, the operation comprising:
   identifying a sequential set of sampled values of at least one performance metric;
   generating, from the set of sampled values, a classification and regression tree, wherein each level of the classification and regression tree below a root node splits the set of sampled values into at least two nodes, each node containing a subset of the sampled values;
   traversing a specified branch of the classification and regression tree until identifying, based on at least one of: (i) a magnitude of a difference in a standard deviation of the subset of sampled values of a first node and a standard deviation of the subset of sampled values of a second node exceeding a first specified magnitude, and (ii) a correlation measure between the subset of sampled values of the first node and a set of correlation values exceeding a second specified magnitude, the first node for use by a predictive modeling analysis; and
   stopping the traversal of the specified branch of the classification and regression tree upon identifying the first node, wherein the first node is identified without pruning any of the nodes below the root node from the classification and regression tree.

2. The non-transitory computer-readable storage medium of claim 1, wherein the at least one performance metric comprises usage of a shared resource of a computing system, wherein the shared resource comprises at least one of: (i) a shared memory, (ii) a shared storage, (iii) a shared CPU space consumed by multiple processes, and (iv) a shared CPU space consumed by multiple virtual machine instances, wherein the first and second specified magnitudes are further used to determine whether the subset of the sampled values in the second node indicate that the computing system will fail due to resource conflicts between the multiple virtual machine instances, wherein the specified branch is the right-most branch of the classification and regression tree.

3. The non-transitory computer-readable storage medium of claim 2, wherein traversing a specified branch of the classification and regression tree until identifying the node for use by the predictive modeling analysis comprises:
   computing the standard deviation of the subset of the sampled values at the first node;
   computing the standard deviation of the subset of the sampled values at the second node, the first node being a child of the second node; and
   determining that the magnitude of the difference between the standard deviation determined for the first node and the standard deviation determined for the second node exceeds the first specified magnitude; and
   identifying the first node as being the node for use by the predictive modeling analysis without computing a standard deviation of a third node and without comparing a magnitude of the difference between the standard deviation of the first node and the standard deviation of the third node, the third node being a child of the first node.

4. The non-transitory computer-readable storage medium of claim 3, wherein the operation further comprises, prior to computing the standard deviation of the subset of the sampled values at the first node, determining that a size of the subset of sampled values in the first node exceeds a minimum sample size.

5. The non-transitory computer-readable storage medium of claim 4, wherein traversing a specified branch of the classification and regression tree until identifying the node for use by a predictive modeling analysis comprises:
   computing the correlation measure between the subset of the sampled values at the first node and the set of correlation values; and
   determining that the correlation measure determined for the first node exceeds the second specified magnitude; and
   identifying the first node as being the node for use by the predictive modeling analysis.

6. The non-transitory computer-readable storage medium of claim 5, wherein the first and second specified magnitudes are configured to determine whether the subset of the sampled values in the second node are more consistent and tightly correlated, respectively, than the subset of sampled values in the first node, wherein the operation further comprises, prior to computing the correlation measure between the subset of the sampled values at the first node and the set of correlation values, determining that a size of the subset of sampled values in the first node exceeds a minimum sample size.

7. The non-transitory computer-readable storage medium of claim 6, wherein the correlation values indicate a time at which each respective element in the subset of the sampled values at the first node was obtained.

8. The non-transitory computer-readable storage medium of claim 7, wherein the operation further comprises:
   performing the predictive modeling analysis using the subset of the sampled value; and
   upon determining the predictive modeling analysis predicted the occurrence of a failure of the computing system, generating an alert message.

9. A system, comprising:
   a processor; and
   a memory storing an application program, which, when executed on the processor, performs an operation for determining a set of data to use for a predictive analysis, the operation comprising:
      identifying a sequential set of sampled values of at least one performance metric;
      generating, from the set of sampled values, a classification and regression tree, wherein each level of the classification and regression tree below a root node splits the set of sampled values into at least two nodes, each node containing a subset of the sampled values;
      traversing a specified branch of the classification and regression tree until identifying, based on at least one of: (i) a magnitude of a difference in a standard deviation of the subset of sampled values of a first node and a standard deviation of the subset of sampled values of a second node exceeding a first specified magnitude, and (ii) a correlation measure between the subset of sampled values of the first node and a set of correlation values exceeding a second specified magnitude, the first node for use by a predictive modeling analysis; and stopping the traversal of the specified branch of the classification and regression tree upon identifying the first node, wherein the first node is identified without pruning any of the nodes below the root node from the classification and regression tree.

10. The system of claim 9, wherein the specified branch is the right-most branch of the classification and regression tree.

11. The system of claim 9, wherein the operation further comprises:

performing the predictive modeling analysis using the subset of the sampled value; and upon determining the predictive modeling analysis predicted the occurrence of a failure of the computing system, generating an alert message.

12. The system of claim 11, wherein traversing a specified branch of the classification and regression tree until identifying the node for use by the predictive modeling analysis comprises:

computing the standard deviation of the subset of the sampled values at the first node;

computing the standard deviation of the subset of the sampled values at the second node, the first node being a child of the second node; and determining that the magnitude of the difference between the standard deviation determined for the first node and the standard deviation determined for the second node exceeds the first specified magnitude; and Identifying the first node as being the node for use by the predictive modeling analysis without computing a standard deviation of a third node and without comparing a magnitude of the difference between the standard deviation of the first node and the standard deviation of the third node, the third node being a child of the first node.

* * * * *